(12) United States Patent
Albrecht et al.

(10) Patent No.: US 6,735,225 B2
(45) Date of Patent: May 11, 2004

(54) CHIRP COMPENSATION METHOD AND APPARATUS

(75) Inventors: Hans-Stephan Albrecht, Göttingen (DE); Matthias Kramer, Göttingen (DE); Marcus Serwazi, Gleichen (DE); Thomas Schroeder, Göttingen (DE); Stefan Niedermeier, Albertshofen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 10/165,766

(22) Filed: Jun. 6, 2002

(65) Prior Publication Data

US 2003/0016708 A1 Jan. 23, 2003

Related U.S. Application Data

(60) Provisional application No. 60/296,816, filed on Jun. 7, 2001.

(51) Int. Cl.$^7$ .............................. H01S 3/10; H01S 3/22
(52) U.S. Cl. ............................................. 372/25; 372/57
(58) Field of Search ........................ 372/20, 25, 29.02, 372/29.022, 30, 55, 57

(56) References Cited

U.S. PATENT DOCUMENTS

| 6,078,599 | A | * | 6/2000 | Everage et al. .............. 372/20 |
| 6,192,064 | B1 | * | 2/2001 | Algots et al. ................. 372/99 |
| 6,317,447 | B1 | * | 11/2001 | Partlo et al. .................. 372/57 |
| 6,421,365 | B1 | * | 7/2002 | Kleinschmidt et al. ..... 372/108 |
| 6,516,012 | B2 | * | 2/2003 | Kleinschmidt et al. .. 372/29.01 |
| 6,529,531 | B1 | | 3/2003 | Everage et al. .............. 372/20 |
| 2001/0053165 | A1 | * | 12/2001 | Wang et al. ............. 372/38.02 |

FOREIGN PATENT DOCUMENTS

| WO | WO 01/56122 A1 | 8/2001 | ............. H01S/3/22 |
| WO | WO 01/59893 A1 | 8/2001 | ............. H01S/3/22 |

* cited by examiner

Primary Examiner—Paul Ip
Assistant Examiner—Phillip Nguyen
(74) Attorney, Agent, or Firm—Stallman & Pollock LLP

(57) ABSTRACT

A wavelength chirp compensation method for an excimer or molecular fluorine laser system operating in burst mode, includes pre-programming into a computer of the laser system resonator tuning optic adjustments for making the adjustments during pauses between bursts to compensate wavelength chirp at beginnings of succeeding bursts.

13 Claims, 7 Drawing Sheets

FIG. 1c (without compensation)

FIG. 1d (with compensation)

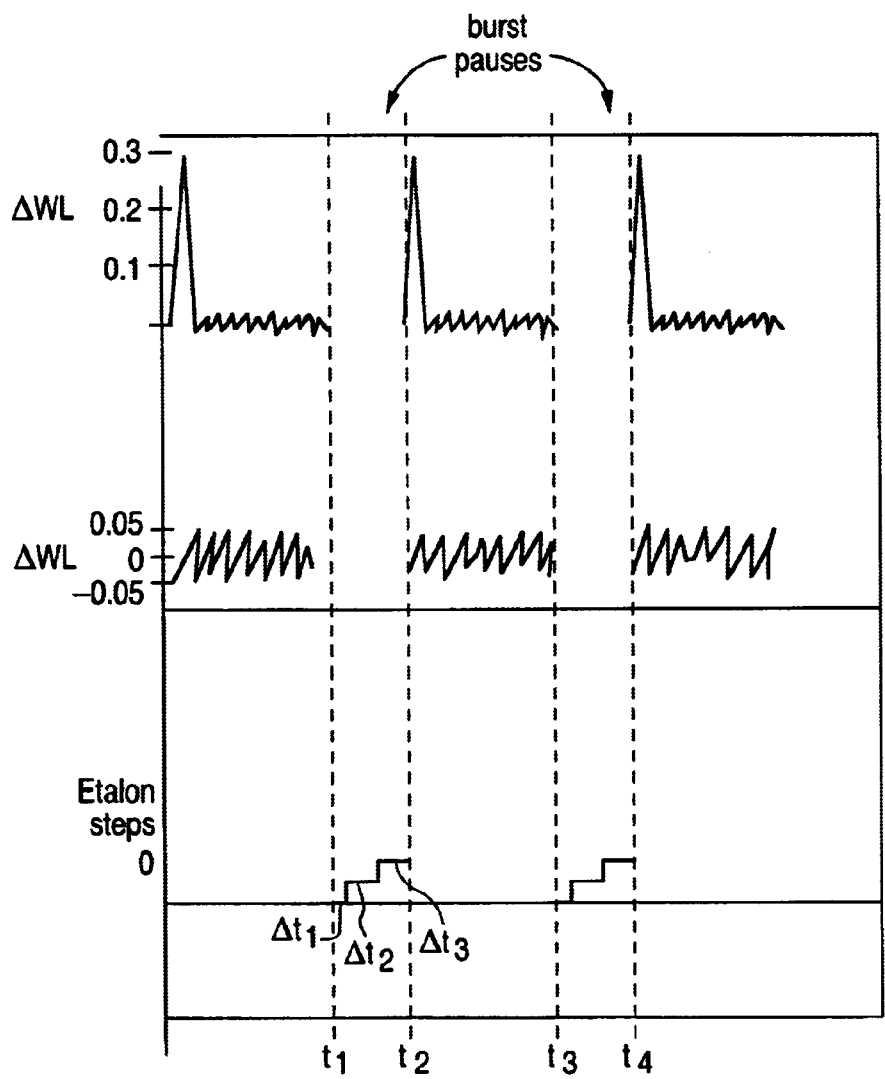

CHIRP COMPENSATION METHOD AND APPARATUS

PRIORITY

This application claims the benefit of priority to U.S. Provisional Application No. 60/296,816, filed Jun. 7, 2001.

BACKGROUND OF THE INVENTION

1. Field of the Invention

The invention relates to a wavelength stabilization technique, and particularly for wavelength chirp compensation of initial pulses in bursts for an excimer or molecular fluorine laser operating in burst mode.

2. Discussion of the Related Art

Excimer and molecular fluorine lasers may be typically operated in burst mode. This means that the laser generates ""bursts"" of pulses, such as 100 to 500 pulses at a constant repetition rate, followed by a burst break or pause of from a few milliseconds up to a few seconds while the stepper/scanner does some wafer positioning. During this pause, the laser may be shifted to low duty cycle such as 50 Hz from 2–4 kHz or more during the burst, or there may be no pulses generated during the pause. A burst break may be a short burst break such as may occur when the beam spot is moved to a different location on a same wafer, or may be a long burst break such as would occur when the stepper/scanner changes between wafers.

When an excimer or molecular fluorine laser is operated in burst mode, the first few pulses of each burst will have a varied wavelength from later pulses if left uncompensated. This variance at the beginning of bursts, hereinafter referred to as ""wavelength chirp,"" may occur, e.g., due to cooling of optics and corresponding refractive index changes in the optics that occur during burst pauses. It is desired to compensate wavelength chirp in order to achieve a constant wavelength of laser pulses throughout bursts.

The problem that the first few pulses after a burst break (at the beginning of a burst) have a different wavelength than the pulses in the middle or at the end of a burst, can be generally understood from the qualitative plots of FIGS. 1c and 2c. FIG. 1c illustrates how the wavelength for an ArF laser having a beam expander/grating line-narrowing configuration is far below a target wavelength at the beginnings of bursts after burst pauses when uncompensated. FIG. 2c illustrates how the wavelength for an KrF laser having a beam expander/grating/etalon line-narrowing configuration is far above a target wavelength at the beginnings of bursts after burst pauses when uncompensated. In the sketches of each of FIGS. 1c and 2c, the first few pulses have a varied wavelength from a target wavelength, and then the wavelength deviation from the target wavelength reduces rapidly until the wavelength reaches approximately the target level. The variance at the beginning of the bursts shown in FIGS. 1c and 2c illustrates wavelength chirp.

In order to provide a constant wavelength through burst including the first few pulses (which is desired during laser operation), the grating and or etalon or other tuning means of the laser wavelength tuning module may be adjusted to a different position at the beginning of the bursts as after the initial pulses. The exact behavior of the wavelength is affected by various parameters in a way that is difficult to predict.

A learning algorithm is described in U.S. Pat. No. 6,078,599 for correcting wavelength chirp. The algorithm operates the laser and measures the wavelengths of pulses in bursts. Then, in future bursts, optical components are tuned to provide a same wavelength at the beginnings of bursts as after the chirp affects the pulses later in the burst, based on what was learned from the earlier measurements on how much the wavelength was deviated. It is difficult, however, to accurately measure wavelengths of individual pulses at the beginnings of bursts, and to accurately predict a wavelength compensation needed for bursts following burst pauses of varying duration. In addition, it is undesirable to have a wavelength compensation technique wherein initial bursts after starting operation of the laser system are used for learning, and having to wait for subsequent bursts in order to apply the wavelength chirp information learned from measurements of the initial bursts. It is desired to have a reliable technique for adjusting the wavelengths of pulses at the beginnings of bursts to a target value.

RECOGNIZED IN THE INVENTION

It is desired to have a reliable technique for compensating wavelength chirp in excimer and molecular fluorine laser systems for adjusting the wavelengths of pulses at the beginnings of bursts to a target value. In addition to that whch has been described above, there are short-term effects and long-term effects that influence the behavior associated with the wavelengths of pulses during bursts and from burst to burst. Short-term effects may last for only a few seconds or less. Long-term effects include gas aging (several days), tube aging (several months) and maybe optical effects (years). These effects may be taken into account by changing controller parameters. The parameter adaptation may be advantageously performed automatically.

The wavelength chirp behavior changes depending on the length of the burst break, the repetition rate of the laser, the wavelengths and/or energies of the most recent pulses and other effects. It is more difficult to control the wavelengths of the first pulses in a burst than it is to keep the wavelength constant for pulses at the middle and end of a burst because the condition of the optics and the laser gas mixture, e.g., do not change as rapidly with time over the duration of the burst as they do during a burst pause. It is thus desired to have a wavelength chirp control algorithm that produces wavelength stability of pulses to a same target wavelength at the beginning of a burst as throughout the entirety of the burst.

SUMMARY OF THE INVENTION

In view of the above, a wavelength chirp compensation method for an excimer or molecular fluorine laser system operating in burst mode, comprising pre-programming into a computer of the laser system resonator tuning optic adjustments for making the adjustments during pauses between bursts to compensate wavelength chirp at beginnings of succeeding bursts.

In particular, a first wavelength chirp compensation method includes operating a gas discharge laser system at an operating duty cycle, e.g., 2–4 kHz, such the laser is operating in a condition such as during a burst when the laser is operated in burst mode for processing structures on a wafer. The laser is then switched to a nominal duty cycle, e.g., 5–50 Hz just sufficient to enable wavelength measurements to be made, and low enough that laser operating conditions change as they would during a burst pause for a laser operating in burst mode. The wavelength is measured for a period of time without adjusting resonator optics to adjust the wavelength, i.e., any wavelength control algorithm available with the laser system is switched off. Resonator optics adjustments are calculated based on the mea-"

surements over this period of time and programmed into a computer of the laser system. When the laser is later operated in burst mode, an optic or optics of the laser resonator is/are adjusted throughout burst pauses according to the programmed adjustments until the beginnings of next bursts, wherein the optic or optics is/are ready to produce pulses at the target wavelength when the next burst begins. The optic or optics is/are returned to standard operating position after the chirp period, such that wavelength chirp is efficiently compensated.

In addition, a second wavelength chirp compensation method includes operating a gas discharge laser system at an operating duty cycle, e.g., 2–4 kHz or more, such the laser is operating in a condition such as during a burst when the laser is operated in burst mode for processing structures on a wafer. The laser is then switched to a nominal duty cycle, e.g., 5–50 Hz, just sufficient to enable wavelength measurements to be made, and low enough that laser operating conditions change as they would during a burst pause for a laser operating in burst mode. A wavelength control algorithm for adjusting the wavelength in a feedback loop between a wavelength measurement device and resonator optics is used to control the wavelength to a target wavelength. The positions of the optic or optics of the resonator are recorded for a period of time and programmed into a computer of the laser system. When the laser is later operated in burst mode, the optic or optics of the laser resonator is/are adjusted throughout burst pauses according to the programming, i.e., just as they were adjusted when the control algorithm was used during the nominal duty cycle operation of the laser, until the beginnings of next bursts, wherein the optic or optics is/are ready to produce pulses at the target wavelength when the next burst begins. The optic or optics is/are returned to standard operating position after the chirp period, such that wavelength chirp is efficiently compensated.

According to either of the first and second methods summarized above, the optic or optics of the laser resonator are stepped to adjusted positions throughout burst pauses. Longer burst pauses will result in the optics being moved further from standard position than shorter pauses, and typically higher wavelength chirps after the longer burst pauses are compensated, as well as those after shorter burst pauses, by appropriate amounts of movement of the resonator optic or optics during the burst pauses. Advantageously, the pause length need not even be known in advance, such that whenever the initial pulses begin for the next burst, the resonator optics are already adjusted in position to compensate wavelength chirp according to burst pause duration. In addition, the technique may be used for initial bursts of the laser, because no learning algorithm is required for computing resonator optics adjustments needed for burst pauses of any length, not to mention burst pauses of many varied lengths.

BRIEF DESCRIPTION OF THE DRAWINGS

FIG. 1c schematically illustrates wavelength versus time for bursts of pulses from an ArF-excimer laser having tuning grating position kept at least approximately constant, relative to chirp adjustment amounts, during bursts and burst pauses, and illustrating wavelength chirp.

FIG. 1d schematically illustrates wavelength versus time for bursts of pulses from an ArF-excimer laser having tuning grating positions adjusted during burst pauses and after wavelength chirps for compensating the wavelength chirp illustrated at FIG. 1c.

FIG. 2c schematically illustrates wavelength versus time for bursts of pulses from a KrF-excimer laser having tuning etalon position kept constant, relative to chirp adjustment amounts, during bursts and burst pauses, and illustrating wavelength chirp.

FIG. 2d schematically illustrates wavelength versus time for bursts of pulses from a KrF-excimer laser having tuning etalon positions adjusted during burst pauses and after wavelength chirps for compensating the wavelength chirp illustrated at FIG. 2c.

FIG. 2e schematically illustrates how etalon positions or operating conditions are preferably stepwise adjusted during burst pauses for preparing to compensate wavelength chirp at the beginning of next bursts after the pauses and produce pulses bursts according to the plot of FIG. 2d.

INCORPORATION BY REFERENCE

What follows is a cite list of references each of which is, in addition to those references cited above in the priority section, hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 4,977,573, 4,952,945, 5,097,291, 5,140,600, 4,674,099, 5,463,650, 5,710,787, 6,078,599, 6,084,897, 6,160,832, 6,269,110, 6,243,406, 6,345,045, 6,381,256, 6,154,470, 6,285,701, 6,389,048, 6,330,267, 6,393,037, 6,393,040, 6,285,701, 6,272,158 and 6,212,214; and U.S. patent application Ser. Nos. 09/513,025, 09/688,561, 09/418,052, 09/447,882, 09/583,037, 09/741,032, 09/715,803, 09/771,366, 09/791,431, 09/791,496, 09/842,281, 09/811,354, 09/903,425, 60/305,368 60/332,573, 60/358,291, 60/278,279, each of which is assigned to the same assignee as the present application.

DETAILED DESCRIPTION OF THE PREFERRED EMBODIMENT

Figure 1A:
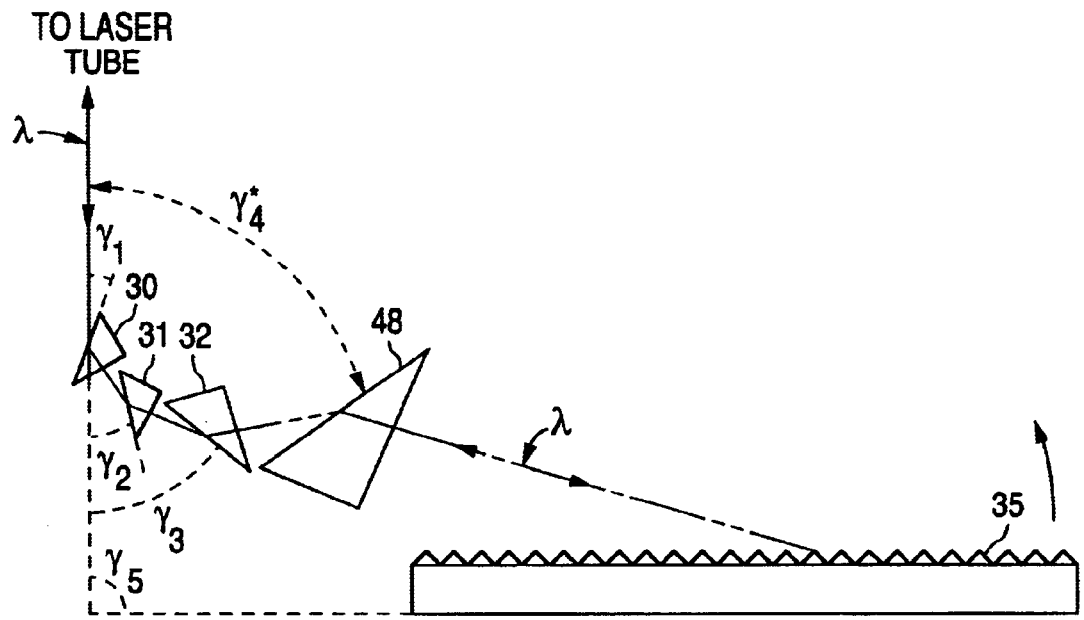
FIG. 1a schematically illustrates a line-narrowing optical configuration of an ArF laser resonator including a rotatable tuning grating according to a preferred embodiment.

FIG. 1a schematically illustrates a line-narrowing optical configuration of an ArF laser resonator including preferably four prisms 30, 31, 32 and 48 (a different number may be used) of a multi-prism beam expander and a rotatable tuning grating 35 according to a preferred embodiment. The prisms and grating are shown making angles $\gamma_1$, $\gamma_2$, $\gamma_3$, $\gamma_4$, $\gamma_5$, respectively to a laser beam direction back toward a laser discharge chamber (not shown, but see FIG. 7 and discussion thereof, below). The rotatable nature of the grating 35 is indicated by the arrows in FIG. a a, wherein the grating is preferably rotated around approximately its center.

Alternatively, the grating may be fixed in position, such as to a heat sink (see the U.S. patent application Ser. No. 09/771,366, incorporated by reference above), while the grating 35 is disposed in a pressure-tunable enclosure (not shown) or while two of the prisms are synchronously rotatable (see the U.S. patent application Ser. No. 09/244,544 incorporated by reference above), or while a pressure tunable or rotatable interferometric device of the resonator, such as may be a pressure tuned output coupling interferometric device (see the U.S. patent application Ser. No. 09/715,803 incorporated by reference above; see also FIG. 1b and discussion thereof, below), for tuning the wavelength.

The line-narrowing module may include other optics such as one or more etalons, one or more dispersive prisms and/or a transmission grating or transmission or reflection grism, and in some cases, a highly reflective mirror as a resonator reflector when a reflective diffraction grating 35 is not used. A transmission grism or transmission grating together with a highly reflective mirror may be substituted for the grating. A reflection grism may also be substituted for the grating 35 (see the '532 application, mentioned above and U.S. patent application Ser. No. 60/173,933, which is assigned to the same assignee and is hereby incorporated by reference). Depending on the laser application and imaging system for which the laser is to be used, alternative line-selection and/or line-narrowing techniques which may be used within the scope of the invention are described at some or all of U.S. Pat. Nos. 4,399,540, 4,905,243, 5,226,050, 5,559,816, 5,659,419, 5,663,973, 5,761,236, and 5,946,337, 6,154,470, 6,061,382 and U.S. patent application Ser. Nos. 09/317,695, 09/130,277, 09/244,554, 09/452,353, 09/602,184, 09/629,256, 60/173,993, 09/712,367, 60/170,342, 9/738,849, 09/780,120, 09/715,803, 09/718,809, 60/200,163, 60/212,257, 60/212,301, 60/215,933, 60/267,567 and 09/599,130, each of which is assigned to the same assignee as the present application, and U.S. Pat. Nos. 5,978,409, 5,999,318, 5,095,492, 5,684,822, 5,835,520, 5,852,627, 5,856,991, 5,898,725, 5,657,334, 5,901,163, 5,917,849, 5,970,082, 5,404,366, 4,975,919, 5,142,543, 5,596,596, 5,802,094, 4,856,018, 4,696,012, 5,646,954, 4,873,692, 4,972,429, 5,596,456, 5,081,635, 4,829,536, 5,748,316, 5,150,370, and 4,829,536, and European patent application no. 0 472 727 A1 and PCT application no. 96/16455, all of which are hereby incorporated by reference. Some of the line selection and/or line narrowing techniques set forth in these patents and patent applications may also be used in combination.

The line-narrowing optics including the beam expander and grating 35 shown in FIG. 1a is specifically contemplated for use with the ArF laser, and may also be used with the KrF and $F_2$ lasers, although preferred embodiments of KrF and $F_2$ laser resonators are either set forth below and/or in the references cited herein. The preferred embodiments set forth herein relating to chirp compensation are not limited to the type of tunable line-narrowing optics used. The beam expander may include fewer or more than the four prisms 30–32 and 48 shown. The beam expander may include other beam expanding optics such as one or more lenses, e.g., a diverging lens and a collimating lens, and may include reflective optics (see, e.g., U.S. Pat. No. 6,163,559, which is hereby incorporated by reference). The prisms 30–32 and 48 may have anti-reflective coatings on one or more surfaces that the beam impinges upon.

The prisms 30–32 and 48 are beam expanding prisms and as such the beam exits each prism 30–32 and 48 approximately normal to the back surface of each prism 30–32 and 48 as the beam propagates toward the grating 35. The angular alignment of each prism 30–32 and 48 is shown relative to the direction of the incoming (and outgoing) beam from (to) the laser tube (not shown). The prisms 30–32 and 48 are preferably aligned as shown having their front or entrance surfaces, respectively, at angles $\gamma_1$, $\gamma_2$, $\gamma_3$ and $\gamma_4$, to the direction of the incoming beam 36. Each prism 30–32 and 48 and any etalon(s) or other transmissive optical components of the line-narrowing module preferably comprise calcium fluoride, and may comprise fused silica particularly for the KrF laser, or another material having similar DUV or VUV transmissive and thermal properties such as $BaF_2$, $SrF_2$, $LiF$, $MgF_2$, etc. (see U.S. patent application Ser. Nos. 60/162,735 and 09/584,420, assigned to the same assignee and hereby incorporated by reference, and the U.S. Pat. No. 5,761,236 patent, mentioned above).

The grating 35 is preferably a highly reflective diffraction grating 35 (some preferred gratings are described in the '835 and '342 applications, mentioned above). The plane of the grating 35 is shown aligned at angle $\gamma_5$ to the direction of the incoming beam 36.

The wavelength of a laser system including the line-narrowing optical configuration of FIG. 1a is preferably processor-controlled according to programming utilizing a feedback loop with a wavelength monitoring device and a chirp compensation algorithm in accord with a preferred embodiment and described in more detail below.

Figure 1E:
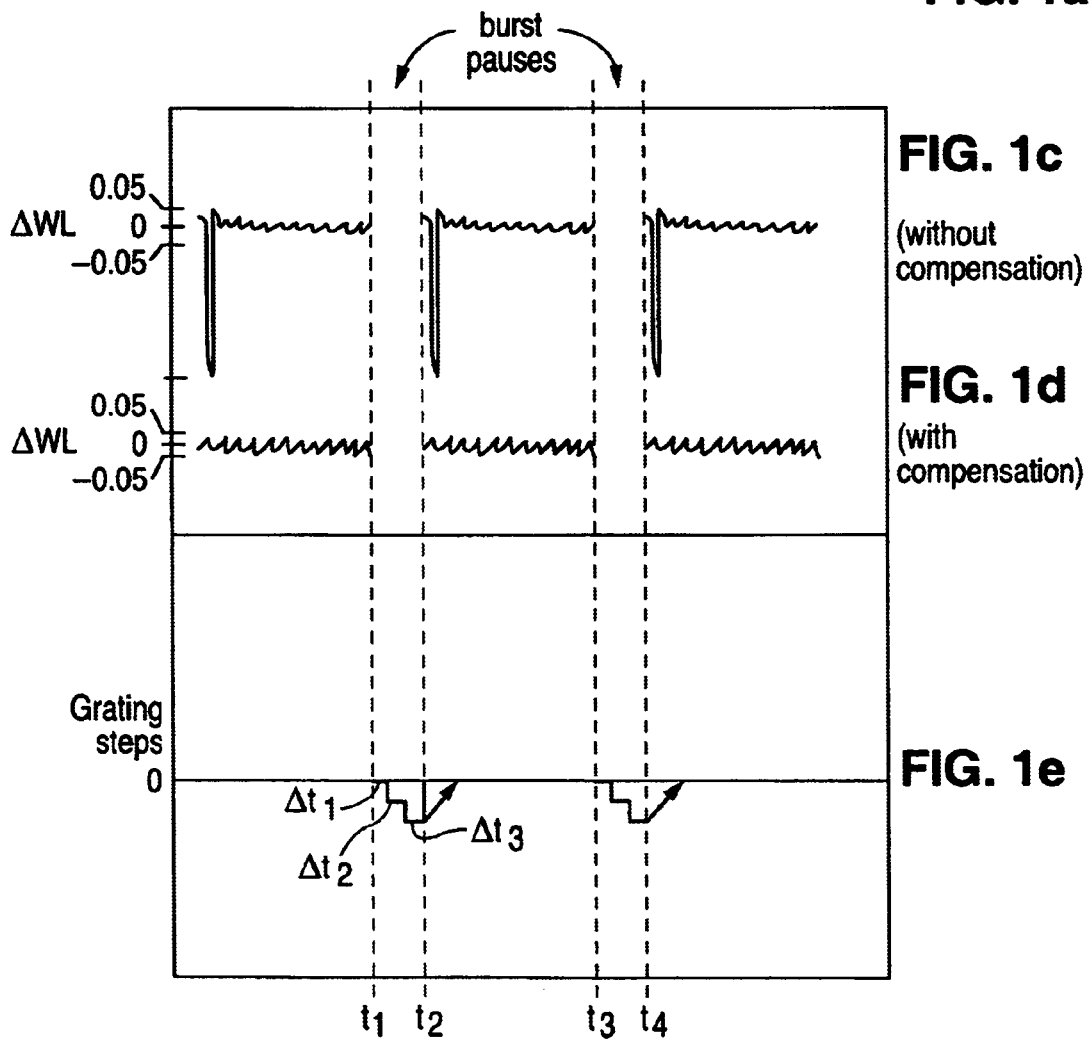
FIG. 1e schematically illustrates how tuning grating position is preferably stepwise adjusted at programmed time intervals during burst pauses for preparing to compensate wavelength chirp at the beginning of next bursts after the pauses, and produce pulse bursts according to the plot shown at FIG. 1d.
Figure 1B:
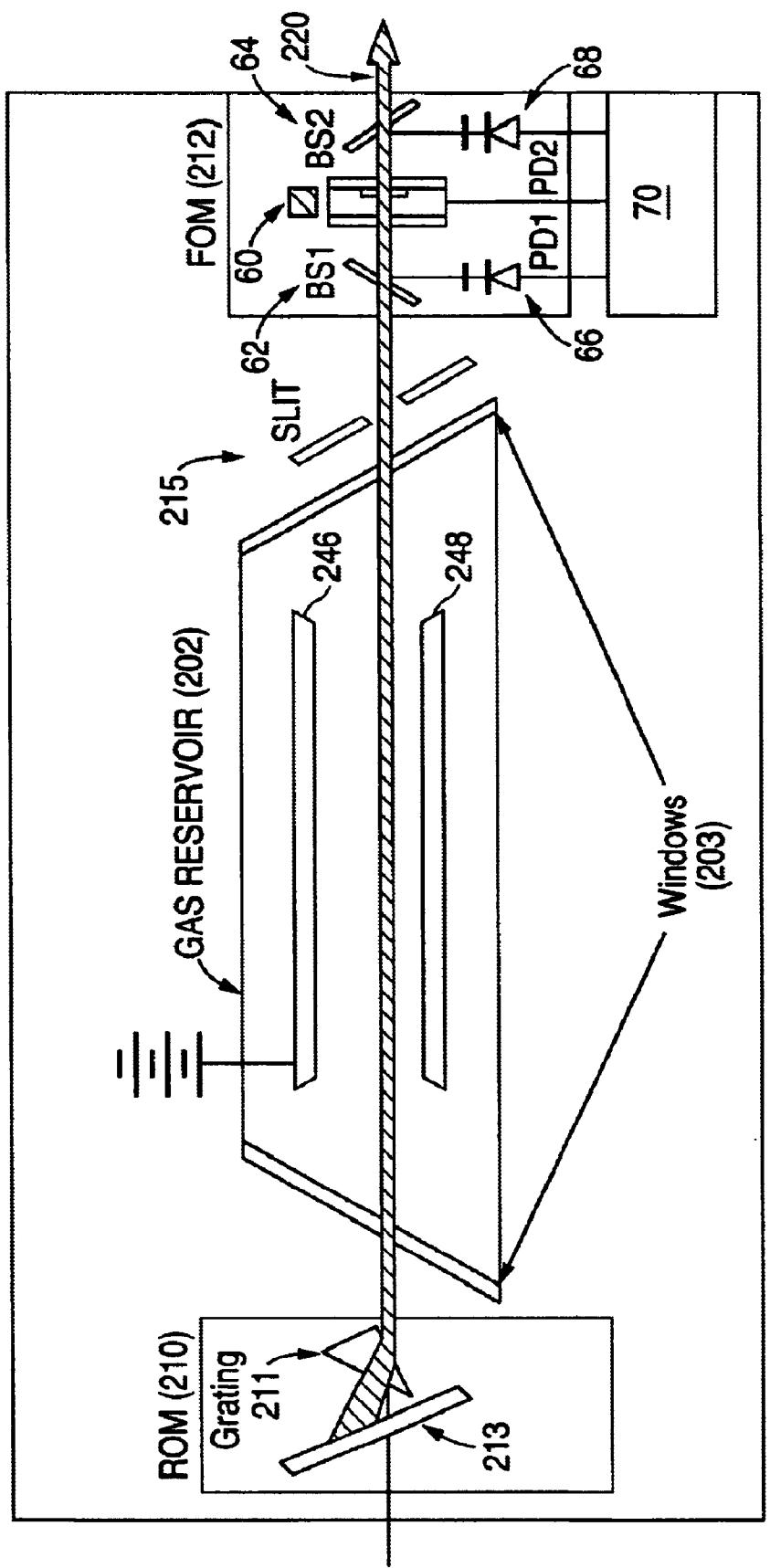
FIG. 1b schematically illustrates a line-narrowing optical configuration of an ArF laser resonator including a rotatable tuning grating and/or a tunable output coupling interferometer according to a preferred embodiment.

FIG. 1b schematically illustrates another line-narrowing optical configuration of an ArF laser resonator including a rotatable tuning grating and/or a tunable output coupling interferometer according to a preferred embodiment. The rear optics module 210 preferably includes a beam expander 211 including one or more prisms and a grating 213, and may be the same or similar to the beam expander with multiple prisms 30–32 and 48 and grating 35 described above with respect to FIG. 1a. The discharge chamber or gas reservoir 202 of the ArF laser resonator has electrodes 246 and 248 therein for energizing a laser active gas mixture and has windows 203 for transmitting DUV or VUV laser radiation. An aperture 215 or slit is shown on the outcoupling side of the chamber 202 away opposite the rear optics module 210. The front optics module 212 preferably includes an outcoupling interferometer 60 having non-parallel inner surfaces, which may be as described in the U.S. patent application Ser. No. 09/715,803, incorporated by reference above, or may be an etalon, i.e., having parallel inner surfaces, such as may be described in U.S. Pat. No. 5,901,163, which is hereby incorporated by reference.

The front optics module 212 includes an output coupling interferometer 60. The interferometer 60 has a first beam splitter 62 and a second beam splitter 64 in front of it and behind it along the optical path of the output beam 220. One or both of the first and second beam splitters 62 and 64, respectively, may be used, depending on the particular synchronization configuration used. The first beam splitter 62 shown in FIG. 1b is for reflecting a portion of the beam reflected by the interferometer 60 to a first photodiode 66. The second beam splitter 64 shown in FIG. 1b is for reflecting a portion of the beam transmitted by the interferometer 60 to a second photodiode 68. An interferometer control unit 70 is shown in FIG. 1b for receiving signals from the first and second photodiodes 66 and 68, respectively, and for controlling the tuning of the interferometer 60. Further details of the preferred excimer or molecular fluorine laser resonator, and the preferred overall laser system, are provided below with respect to FIG. 7.

The output coupling interferometer 60 located inside of the front optics module 212 of FIG. 1b is adjusted as controlled by the control unit 70 to reflect radiation at or very near a spectral maximum produced by the echelle grating 213. This grating 213 is located inside the narrow band unit of the rear optics module 210 of FIG. 1b, as described above. Synchronization in this sense means the interferometer 60 has its maximum of reflection at or near the maximum of the spectral distribution of the intracavity laser radiation produced by the narrow band optics of the rear optics module 210. Several preferred embodiments are disclosed for tuning the interferometer 60 to match or nearly the "maximum" wavelength selected by the rear optics module 210. The interferometer 60 may be adjusted for fine or rapid tuning without adjusting the grating 213 as quickly, wherein the grating 213 may also be generally adjusted with any drift of the wavelength due to heating of optics, etc.

There are generally three synchronization techniques for the interferometer 60 that are particularly preferred (for more details, see the U.S. patent application Ser. No. 09/715,803, incorporated by reference above):

1) A first preferred technique includes tuning of the outcoupling interferometer 60 to get maximum intracavity power reflection. This entails a minimum degree of outcoupling and minimized intracavity losses.

2) A second preferred technique includes tuning of the outcoupling interferometer 60 to get maximum intensity of interference fringes behind a monitor etalon disposed where the second photodiode 68 is shown in FIG. 1b.

3) A third preferred technique includes tuning of the outcoupling interferometer 60 and detection of the reflected (or transmitted) light by a position—sensitive detector (e.g., double- or quadrant photodiode) disposed where either of the first or second photodiodes 66 or 68, respectively, are shown in FIG. 1b.

FIG. 1c schematically illustrates wavelength versus time for bursts of pulses from an ArF-excimer laser having tuning grating and/or tuning interferometric device position or positions kept at least approximately constant, relative to chirp adjustment amounts, during bursts and burst pauses, and illustrating wavelength chirp. Burst pauses are illustrated as occurring between times $t_1$ and $t_2$ and between times $t_3$ and $t_4$ in FIG. 1c, as well as in FIGS. 1d–1e. At time $t_2$ and at time $t_4$, a spike or large wavelength deviation referred to herein as wavelength chirp is shown in FIG. 1c. This chirp has been observed to occur for excimer or molecular fluorine laser systems, such as that described below with respect to FIG. 7, when chirp compensation is not performed such as set forth in preferred embodiments herein. As shown, the wavelength of the laser system may vary within some range, e.g., +/−0.05 to 5% depending on the accuracy of the wavelength control system used. However, the chirp causes the wavelength to deviate typically far outside of this range at the beginnings of bursts, such as at times $t_2$ and $t_4$ in FIG. 1c.

FIG. 1d schematically illustrates wavelength versus time for bursts of pulses from an ArF-excimer laser having tuning grating positions adjusted during burst pauses and after wavelength chirps for compensating the wavelength chirp illustrated at FIG. 1c. FIG. 1d shows no chirp at times $t_2$ and $t_4$ due to wavelength tuning optics of the resonator being adjusted at the beginnings of bursts to compensate anticipated chirp. At the beginnings of bursts, the optics are tuned to compensate the chirp and then quickly returned to standard positions for the remainders of the bursts.

FIG. 1e schematically illustrates how tuning grating position is preferably stepwise adjusted at programmed time intervals during burst pauses for preparing to compensate wavelength chirp at the beginning of next bursts after the pauses, and produce pulse bursts according to the plot shown at FIG. 1d. The tuning optics of the resonator typically are tuned in steps. During a burst pause, wavelength changes will correspond to time intervals, e.g., $\Delta t_1$ and $\Delta t_2$, as respectively shown for stepping the grating 35 or 213 by a first and a second steps during the pause between times $t_1$ and $t_2$. Also, a time interval $\Delta t_3$ corresponds to a time between the second stepping of the grating 35, 213 and the beginning of the next burst at time $t_2$, wherein the time interval $\Delta t_3$ was not long enough to step the grating by a third step during the pause. A somewhat longer pause might have resulted in the grating 35, 213 being stepped by the third step during the pause.

The lengths of burst pauses need not be known in advance, and only the time dependence of the wavelength change during pauses is used for stepping the grating 35, 213 during the pause as many times as correspond to the wavelength change until the next burst begins. Preferably a same processor as receives a trigger signal from an external controller for signaling a discharge circuit of the laser system (see FIG. 7, below) to begin a burst also controls the chirp compensation so that optics are adjusted synchronously with the beginning of the burst back to standard positions once the chirp period has passed. Alternatively, burst pause durations may be received by the processor in advance, such that the processor may step the tuning optic, e.g., the grating 35, 213, straight to the position corresponding to the beginning of the next burst at the beginning of the pause, rather than stepping throughout the pause period.

Figure 2A:
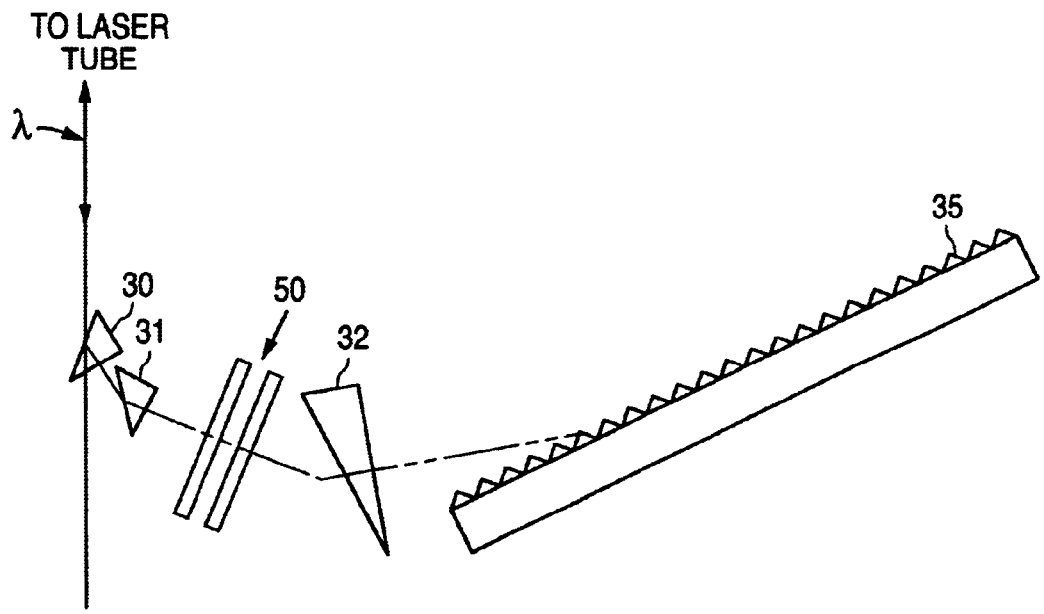
FIGS. 2a–2b schematically illustrate KrF laser resonators each including a tuning etalon and/or tuning grating according to a preferred embodiment.
Figure 2B:
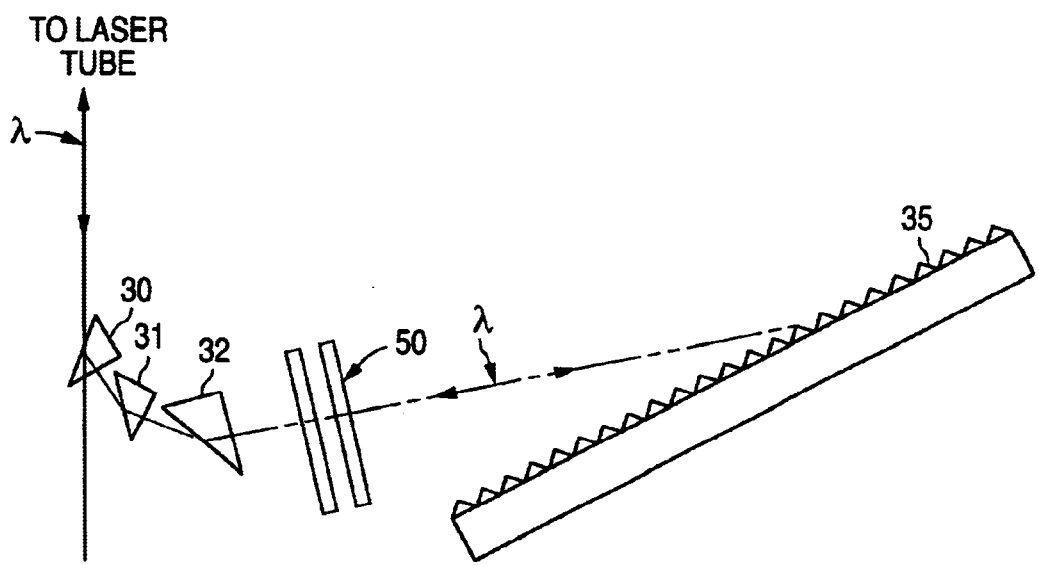

FIGS. 2a–2b schematically illustrate KrF laser resonators each including a tuning etalon and/or tuning grating according to a preferred embodiment. The line-narrowing module of FIG. 2a is particularly preferred for use with a KrF laser, but the discussion below may be relevant to ArF or $F_2$ lasers having an etalon or other interferometric device within its resonator. The line-narrowing module shown in FIG. 2a has a beam expander including three beam expanding prisms 30–32. There may be more or fewer than three prisms, and the beam expander may use one or more lenses or reflective optics in addition to or in lieu of the prisms 30–32.

An etalon 50 is shown included in the line-narrowing module of FIG. 2a. The etalon may be within an enclosure together with the grating 35 which may be attached to a heat sink, as described in the U.S. patent application Ser. No. 09/771,366, incorporated by reference above. The pressure within the enclosure may be varied to tune and/or select the wavelength using over-or under-pressure, and filled with stagnant gas using no purging gas flow or flowing gas using a continuous gas flow. The etalon 50 and the grating 35 are each preferably initially aligned at selected angles to the beam depending on the desired wavelength range to be used, wherein the position of the etalon 50 or grating 35 or both may be adjusted from the standard position to compensate chirp at beginnings of burst.

As is understood by those skilled in the art, an etalon is a specific case of a more general class of interferometric devices, wherein an etalon has a pair of inner, reflecting, parallel plates. The etalon 50 shown in FIG. 2a is one that has a pair of flat plates, although an etalon 50 may generally have curved plates or may have another geometry wherein a gap spacing between the plates in constant over the cross section of the etalon 50. Wherever an etalon is mentioned herein, an interferometric device having parallel of non-parellel plates, may be substituted and used within the scope of this description of the preferred embodiments.

The line-narrowing module of FIG. 2b illustrates another advantageous embodiment featuring positioning the etalon 50 after the third beam expanding prism 32, rather than after the prisms 30–31 and before the prism 32, as shown in FIG. 2a. In any of the embodiments herein, wavelength tuning may be performed by means described herein or as known to those skilled in the art such as by rotating the grating or another element such as a prism, or prisms or an etalon, or by pressure tuning the grating, the etalon, the whole line-narrowing unit, etc. The grating 35 may be connected to a heat sink or may be conventionally disposed within the line-narrowing module of the excimer or molecular fluorine laser (see, e.g., U.S. Pat. No. 6,094,448, hereby incorporated by reference).

In the embodiment shown in FIG. 2a, the first two beam expanding prisms 30 and 31 encounter the beam as it emerges from the laser tube (not shown). Next, the beam traverses the etalon 50 and finally the third beam expanding prism 32 prior to impinging upon the grating 35. This line-narrowing portion of the resonator may be part of a polarization coupled resonator as is known in the art (see, e.g., U.S. Pat. No. 5,150,370 and 5,559,816, hereby incorporated by reference).

The embodiment of FIG. 2b is particularly preferred for lasers operating at high repetition rates (e.g., 2–4 kHz or more), and correspondingly with reduced discharge widths (see U.S. patent application Ser. No. 09/453,670 application, assigned to same assignee and hereby incorporated by reference). The third beam expanding prism 32 is disposed before the etalon 50 in the embodiment of FIG. 2b, wherein the positions of this prism 32 and the etalon 50 are switched from that shown and described with respect to FIG. 2a. By having the third prism 32 before the etalon 50, the beam divergence is reduced and beam expansion is increased before the beam is incident on the etalon 50, compared with the arrangement of FIG. 2a. The reduced divergence advantageously provides improved performance of the etalon 50 as a smaller range of incidence angle of rays of the incident beam are subjected to the angularly dependent interference properties of the etalon 50.

The inclusion of the grating 35, interferometric device 50 which may be disposed in the rear optics module, as shown in FIGS. 2a–2b, or in the front optics module, as shown in FIG. 1b, e.g., as an output coupling device, and prisms 30–32 of the beam expander permit operation at bandwidths below 1 pm. The prisms 30–32 and the interferometeric device 50 (which is preferably an etalon when used in the line-narrowing module of the rear optics, e.g., in a KrF laser or $F_2$ laser, and is preferably as set forth at U.S. patent application Ser. No. 09/715,803, when used as an outcoupler, e.g., in an ArF or $F_2$ laser) each incur absorption which occurs at a higher rate when the laser is operated at higher repetition rates, e.g., at or above 2 kHz. The prisms 30–32 of the beam expander and plates of the interferometric device are advantageously formed of a thermally stable material (such as has low absorption, high thermal conductivity, etc.) at DUV wavelengths and below, and specifically at 248 nm for the KrF laser, 193 nm for the ArF laser and 157 nm for the F2 laser. Such materials include preferably $CaF_2$, $MgF_2$, $BaF_2$ or LiF. $CaF_2$ is mostly preferred and $MgF_2$ is alternatively preferred to $CaF_2$.

FIGS. 2c–2e will be next described for an embodiment wherein only the etalon 50 of the line-narrowing modules of FIGS. 2a–2b is rotated for chirp compensation purposes, although the grating 35 and/or one or more prisms 30–32 may be also adjusted in other embodiments. When only the etalon 50 is adjusted, the energy of the discharge may be increased slightly after taking into account any burst energy compensation being used (see U.S. patent application Ser. No. 09/688,561 incorporated by reference above) to compensate for mismatch between the etalon 50 and grating 35 alignments at the beginnings of bursts 35.

FIG. 2c schematically illustrates wavelength versus time for bursts of pulses from a KrF-excimer laser having tuning etalon position kept constant, relative to chirp adjustment amounts, during bursts and burst pauses, and illustrating wavelength chirp. Burst pauses are illustrated as occurring between times $t_1$ and $t_2$ and between times $t_3$ and $t_4$ in FIG. 2c, as well as in FIGS. 2d–2e. At time $t_2$ and at time $t_4$, a spike or large wavelength deviation referred to herein as wavelength chirp is shown in FIG. 2c, and for particular embodiments herein the deviation is opposite to that shown in FIG. 1c, although for some embodiments the deviations may be in the other direction. This chirp has been observed to occur for excimer or molecular fluorine laser systems, such as that described below with respect to FIG. 7, when chirp compensation is not performed such as set forth in preferred embodiments herein. As shown, the wavelength of the laser system may generally vary after the chirp period within some range, e.g., +/−0.05 to 5% depending on the accuracy of the wavelength control system used. However, the chirp causes the wavelength to deviate typically far outside of this range at the beginnings of bursts, such as at times $t_2$ and $t_4$ in FIG. 2c.

FIG. 2d schematically illustrates wavelength versus time for bursts of pulses from a KrF-excimer laser having tuning etalon positions adjusted during burst pauses and after wavelength chirps for compensating the wavelength chirp illustrated at FIG. 2c. FIG. 2d shows no chirp at times $t_2$ and $t_4$ due to wavelength tuning optics of the resonator being adjusted at the beginnings of bursts to compensate anticipated chirp. At the beginnings of bursts, the optics are tuned to compensate the chirp and then quickly returned to standard positions for the remainders of the bursts.

FIG. 2e schematically illustrates how etalon positions or operating conditions are preferably stepwise adjusted during burst pauses for preparing to compensate wavelength chirp at the beginning of next bursts after the pauses and produce pulses bursts according to the plot of FIG. 2d. The tuning optics of the resonator typically are tuned in steps. During a burst pause, wavelength changes will correspond to time intervals, e.g., $\Delta t_1$, and $\Delta t_2$, as respectively shown for stepping the etalon 50 by a first and a second steps during the pause between times $t$, and $t_2$. Also, a time interval $\Delta t_3$ corresponds to a time between the second stepping of the etalon 50 and the beginning of the next burst at time $t_2$, wherein the time interval $\Delta t_3$ was not long enough to step the etalon 50 by a third step during the pause. A somewhat longer pause might have resulted in the etalon 50 being stepped by the third step during the pause.

The lengths of burst pauses need not be known in advance, and only the time dependence of the wavelength change during pauses is used for stepping the etalon 50 during the pause as many times as correspond to the wavelength change until the next burst begins. Preferably a same processor as receives a trigger signal from an external controller for signaling a discharge circuit of the laser system (see FIG. 7, below) to begin a burst also controls the chirp compensation so that optics are adjusted synchronously with the beginning of the burst back to standard positions once the chirp period has passed. Alternatively, burst pause durations may be received by the processor in advance, such that the processor may step the tuning optic, e.g., the etalon 50, straight to the position corresponding to the beginning of the next burst at the beginning of the pause, rather than stepping throughout the pause period.

Figure 3:
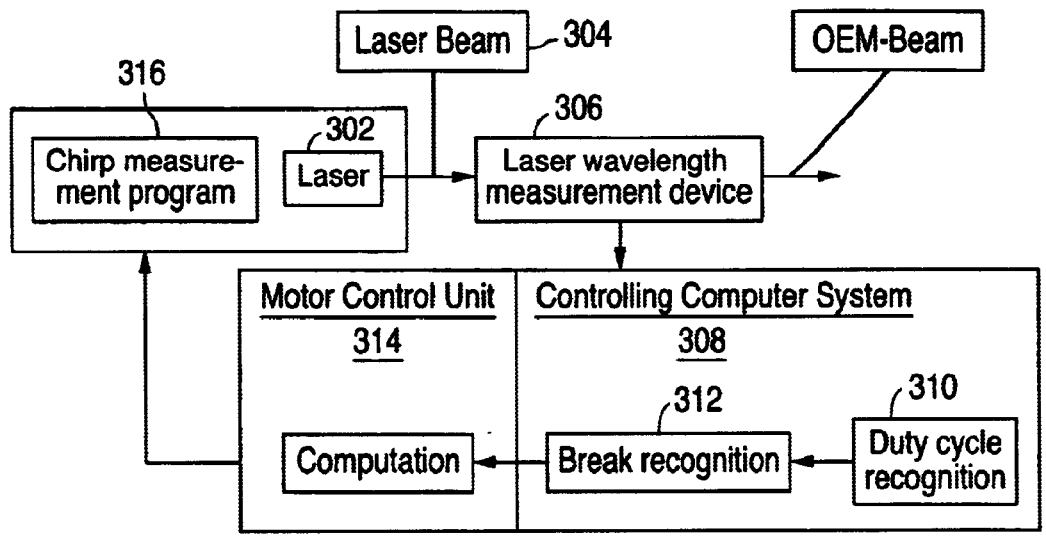
FIG. 3 illustrates a wavelength chirp correction system according to a preferred embodiment.

FIG. 3 illustrates a wavelength chirp correction system according to a preferred embodiment. The system includes a laser 302 for emitting a laser beam 304. A wavelength measurement device 306, such as a monitor etalon 8 (see U.S. Pat. No. 4,905,243 which is hereby incorporated by reference) or other spectrometer such as a grating spectrometer, receives at least a portion of the beam 304. A controlling computer system 308 receives wavelength information from the wavelength measurement device 306. The particular duty cycle being used is recognized by the system 310, wherein when the laser is not being operated at the duty cycle (typically greater than 1 kHz), then the controller 308 recognizes a break period 312. The controller 308 is synchronized with a motor control unit 314, wherein computation of steps of tuning elements with the laser resonator will be used to control the stepping during the pauses as described with respect to FIGS. 1e and 2e above. In this way, a chirp measurement program 316 is developed.

The system may be operated at a particular duty cycle under cw operation for a duration until the optics are stabilized such as during a burst when the laser will be operated later in burst mode during wafer processing. The laser is then switched to low duty cycle (e.g., less than 100 hz such as preferably between 5 hz and 50 hz). At this time, one of two preferred chirp measurement methods are performed.

In the first method, the wavelength is allowed to vary from that measured when the laser was being operated at high duty cycle, and the wavelength is measured for each pulse emitted at the low duty cycle. In other words, any wavelength control algorithm that may be loaded into the programming of the control system 308 is not used A function of the wavelength of the beam 204 emitted by the laser 202 with time from the time of switching from high to low duty cycle is computed from the data.

The chirp measurement program is assembled from the data using known wavelength changes occurring when the tuning optics are stepped. For example, if each step corresponds to a wavelength change $\Delta \lambda$, and a wavelength change of $\Delta \lambda$ is measured to occur after times $\Delta t_1$, $\Delta t_2$, $\Delta t_3$, etc. after switching the duty cycle from high to low, then steps of the tuning optic or optics may be programmed to occur during pauses at these time intervals, or some different intervals to average variance from exact chirp compensation due to the discrete stepping of the tuning optics or optics rather than if the optics were continuously tunable during burst pauses. The method may be performed for more than one duty cycle that the laser may be operated at for industrial processing and the results stored into the chirp compensation program for each duty cycle.

In the second method, the wavelength is controlled at a target wavelength, such as that of the beam emitted furing high duty cycle operation, and the stepping of the position of the tuning optic or optics is stored for each pulse emitted at the low duty cycle. In other words, a wavelength control algorithm loaded into the programming of the control system 308 is used in a feedback loop involving the laser wavelength measurement device 306, the controller 308 and the motor control unit 314. A function of the positions of the tuning optics with time from the time of switching from high to low duty cycle is computed from the data.

The chirp measurement program is assembled from the data. For example, if the steps corresponding to a wavelength changes $\Delta \lambda$ occurred during the measurements after times $\Delta t_1$, $\Delta t_2$, $\Delta t_3$, etc. after switching the duty cycle from high to low, then corresponding steps of the tuning optic or optics may be programmed to occur during pauses at these time intervals, or some different intervals to average variance from exact chirp compensation due to the discrete stepping of the tuning optics or optics rather than if the optics were continuously tunable during burst pauses. The method may be performed for more than one duty cycle that the laser may be operated at for industrial processing and the results stored into the chirp compensation program for each duty cycle.

Figure 4:
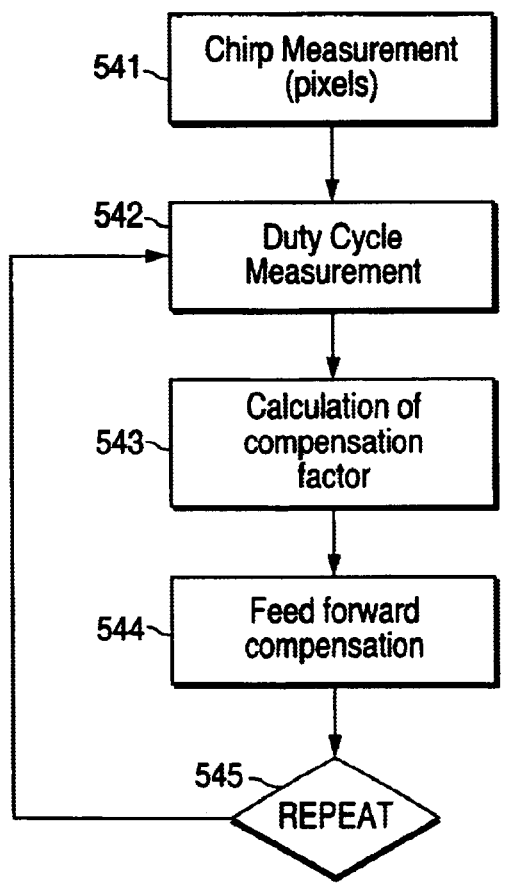
FIG. 4 shows a flowchart illustrating a preferred method for wavelength chirp compensation.

FIG. 4 shows a flowchart illustrating a preferred method for wavelength chirp compensation during laser operation in burst mode. Operation S41 is corresponds to either of the first and second methods described above. When the laser is operated during industrial processing, the operating duty cycle is measured or a control processor otherwise retrieves duty cycle information at operation S42. The appropriate chirp compensation routine is obtained for the operating duty cycle at operation S43. A feed forward compensation operation is run at step S44, such that the stepping of the tuning optic or optics corresponding to the routine obtained during step S43 is used when the laser system goes into a pause. The operations S42–S44 are then repeated according to operation S45 during laser operation so that if the duty cycle is changed, then the appropriate chirp compensation is obtained at operation S43 and used at operation S44 during pauses.

Figure 5:
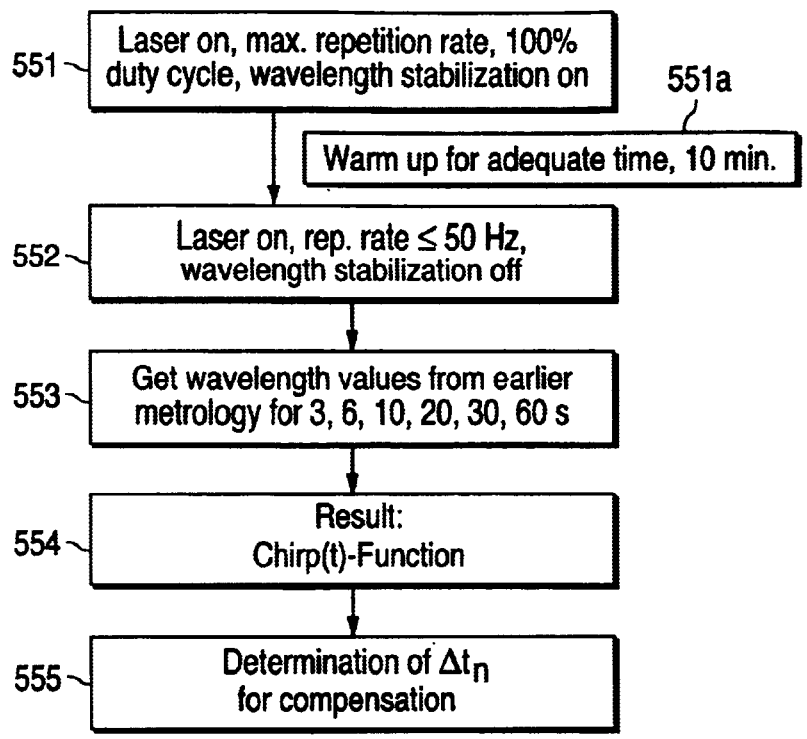
FIG. 5 shows a flowchart illustrating chirp compensation information data measurement according to a preferred embodiment.

FIG. 5 shows a flowchart illustrating chirp compensation information data measurement according to a preferred embodiment. The flow chart of FIG. 5 corresponds to the first chirp measurement method described above and the operation S41 of the flow chart of FIG. 4. Variations of the method shown at FIG. 5 will be described below, particularly for the second chirp measurement method described above.

At operation S51, the laser is operated at high duty cycle, i.e., corresponding to a duty cycle anticipated to be laser used during industrial processing, with wavelength stabilization on at a target wavelength. The system is run (S51a) for an adequate warm up time at this duty cycle preferably in cw mode. Then, at operation S52, the laser is switched to low duty cycle, e.g., 50 Hz or less, with wavelength stabilization off for the first chirp measurement method. For the second method, the wavelength stabilization remains on.

Wavelengths are measured as a function of time at operation S53 in the first method (and tuning optic positions are recorded as a function of time in the second method at operation S53). A function is calculated at operation S54 of the chirp effect on the wavelength as a function of pause time, or time from the switching to low duty cycle. At operation S55, a determination of time intervals between stepping the tuning optics during burst pauses is determined, corresponding to the intervals $\Delta t_1$, $\Delta t_2$, etc. described above with reference to FIGS. 1e and 2e, so that the chirp will be compensated when next bursts occur when the laser is operated in burst mode during industrial processing.

Figure 6:
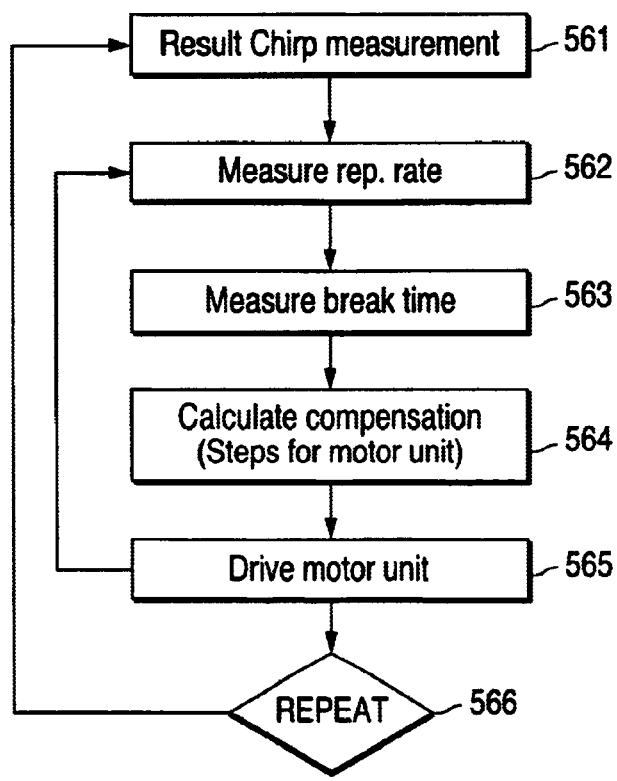
FIG. 6 shows a flowchart illustrating a preferred method for wavelength chirp compensation.

FIG. 6 shows a flowchart illustrating an alternative method for wavelength chirp compensation. A chirp measurement is performed for a laser operating in burst mode at operation S61, which information may be measured during a downtime or warm-up time in an industrial processing macro-routine. The repetition rate is obtained at operation S62 that the laser was operating in just before the pause wherein the chirp was measured in operation S61. The break time of the pause is also measured or obtained at operation S63. A compensation for a next time a same or similar pause is to occur for a same or nearly same repetition rate operation is calculated, such as in steps of the tuning optic or optics at operation S64. The optics are stepped the corresponding amount at operation S65 when this pause break occurs. When the repetition rate is changed at step S62, then steps S63–S65 are performed according to the different repetition rate. The chirp compensation may be repeated according to operation S66 when other changes in operation occur such as when the laser system ages, or the routine may be run any time there is an opportunity to update the system, such as during maintenance intervals schedules for other reasons.

Overall Laser System

Figure 7:
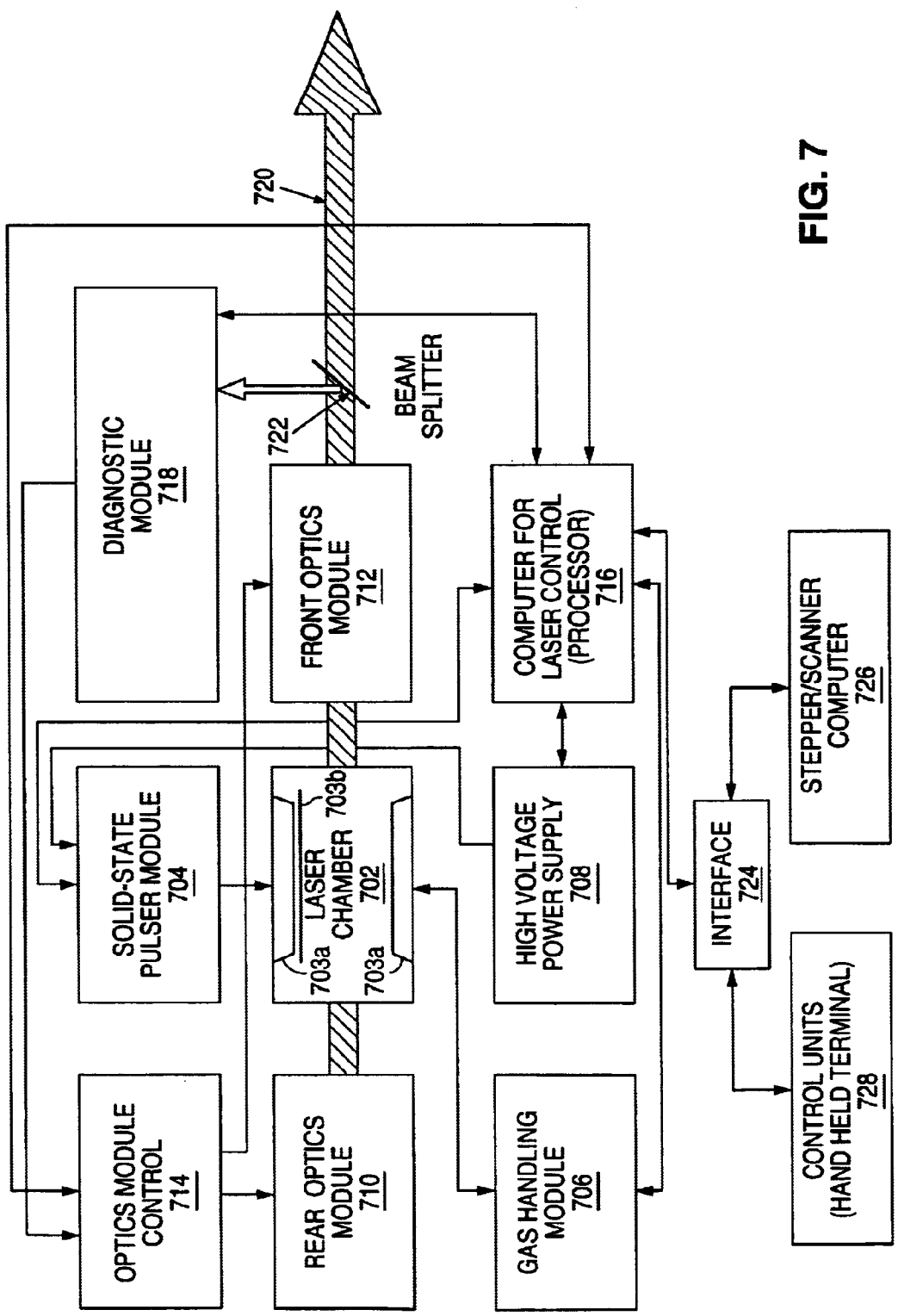
FIG. 7 schematically shows an excimer or molecular fluorine laser system in accord with a preferred embodiment.

FIG. 7 schematically illustrates an excimer or molecular fluorine laser system according to a preferred embodiment. Referring to FIG. 7, a gas discharge laser system, preferably a DUV or VUV laser system, such as an excimer, e.g., ArF or KrF, or molecular fluorine ($F_2$) laser system for deep ultraviolet (DUV) or vacuum ultraviolet (VUV) lithography, is schematically shown. Alternative configurations for laser systems for use in such other industrial applications as TFT annealing and/or micromachining, e.g., are understood by one skilled in the art as being similar to and/or modified from the system shown in FIG. 7 to meet the requirements of that application. Moreover, features set forth herein may be included with an EUV source such as of a lithography system for generating radiation around 11 nm to 15 nm (see, e.g., U.S. patent application Ser. No. 10/109,581, which is assigned to the same assignee as the present application, and references relating to alternative EUV systems cited therein, and U.S. Pat. No. 5,504,795, which are hereby incorporated by reference).

The system shown in FIG. 7 generally includes a laser chamber 702 having multiple electrodes 703a, 703b connected with a solid-state pulser module 704, and a gas handling module 706. The solid-state pulser module 704 is powered by a high voltage power supply 708. The laser chamber 702 is surrounded by optics module 710 and optics module 712, forming a laser resonator. The optics modules 710 and 712 are controlled by an optics control module 714, or may be alternatively directly controlled by a computer 716.

The computer 716 for laser control receives various inputs and controls various operating parameters of the system. A diagnostic module 718 receives and measures one or more parameters of a split off portion of the main beam 720 via optics for deflecting a small portion of the beam toward the module 718, such as preferably a beam splitter module 722, as shown. The beam 720 is preferably the laser output to an imaging system (not shown) and ultimately to a workpiece (also not shown), and may be output directly to an application process. The laser control computer 716 communicates through an interface 724 with a stepper/scanner computer 726 and other control units 728.

Laser Chamber

The laser chamber 702 contains a laser gas mixture and includes one or more preionization electrodes 703b in addition to the pair of main discharge electrodes 703a. Preferred main electrodes 703a are described at U.S. patent application Ser. No. 09/453,670, which is assigned to the same assignee as the present application and is hereby incorporated by reference. Other electrode configurations are set forth at U.S. Pat. No. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units 703b are set forth at U.S. patent applications Ser. Nos. 09/692,265, 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference. The laser chamber 702 also includes a fan (not shown) for circulating the gas mixture through the discharge region between the main electrodes 703a, and heat exchanger for controlling the temperature of the gas mixture (see U.S. patent application Ser. Nos. 09/823,298 and 10/112,070, which are assigned to the same assignee as the present application and are hereby incorporated by reference).

Power Supply Circuit and Pulser Module

The solid-state pulser module 714 and high voltage power supply 708 supply electrical energy in compressed electrical pulses to the preionization and main electrodes 703a, 703b within the laser chamber 702 to energize the gas mixture. Components of the preferred pulser module and high voltage power supply may be described at U.S. patent application Ser. Nos. 09/640,595, 09/838,715, 09/858,147, and 09/432,348, and U.S. Pat. Nos. 6,005,880, 6,198,761 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 1 Joule of electrical power (see the '988 patent, mentioned above).

Laser Resonator

The laser resonator which surrounds the laser chamber 702 containing the laser gas mixture includes optics module 710 including line-narrowing optics for a line narrowed excimer or molecular fluorine laser, which may be replaced by a high reflectivity mirror or the like in a laser system wherein either line-narrowing is not desired, or if line narrowing is performed at the front optics module 712, or a spectral filter external to the resonator is used, or if the line-narrowing optics are disposed in front of the HR mirror, for narrowing the bandwidth of the output beam.

The laser chamber 702 is sealed by windows transparent to the wavelengths of the emitted laser radiation 714. The windows may be Brewster windows or may be aligned at another angle, e.g., 5°, to the optical path of the resonating beam. One of the windows may also serve to output couple the beam and one of the window may be sealed by an element that serves as a highly reflective resonator reflector (see the U.S. Pat. No. 6,345,045, incorporated by reference above).

Extra-Resonator Features

After a portion of the output beam 720 passes the outcoupler of the optics module 712, that output portion impinges upon beam splitter module 722 which includes optics for deflecting a portion of the beam to the diagnostic module 718, or otherwise allowing a small portion of the outcoupled beam to reach the diagnostic module 718, while a main beam portion 720 is allowed to continue as the output beam 720 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 718. A holographic beam sampler, transmission grating, partially transmissive reflection diffraction grating, grism, prism or other refractive, dispersive and/or transmissive optic or optics may also be used to separate a small beam portion from the main beam 720 for detection at the diagnostic module 718, while allowing most of the main beam 720 to reach an application process directly or via an imaging system or otherwise.

The output beam 720 may be transmitted at the beam splitter module 722 while a reflected beam portion is directed at the diagnostic module 718, or the main beam 720 may be reflected, while a small portion is transmitted to the diagnostic module 718. The portion of the outcoupled beam which continues past the beam splitter module 722 is the output beam 720 of the laser, which propagates toward an industrial or experimental application such as an imaging system and workpiece for photolithographic applications. Variations of beam splitter modules particularly for a molecular fluorine laser system are set forth at U.S. patent applications Ser. No. 09/598,552 and 09/718,809, which are each assigned to the same assignee and are hereby incorporated by reference.

Beam Path Enclosure

Also particularly for the molecular fluorine laser system, and for the ArF laser system, and which may be used with a KrF laser system and an EUV system, an enclosure (not shown) may seal the beam path of the beam 720 such as to keep the beam path free of photoabsorbing species. Smaller enclosures may seal the beam path between the chamber 702 and the optics modules 710 and 712 and between the beam splitter 722 and the diagnostic module 718. The preferred enclosure is described in detail in U.S. Pat. No. 6,219,368 and the U.S. patent application Ser. No. 09/598,552 and U.S. patent applications Ser. Nos. 09/594,892 and 09/131,580, each of which is assigned to the same assignee and is hereby incorporated by reference, and U.S. Pat. Nos. 5,559,584, 5,221,823, 5,763,855, 5,811,753 and 4,616,908, all of which are hereby incorporated by reference.

Diagnostic Module

The diagnostic module 718 preferably includes at least one energy detector. This detector measures the total energy of the beam portion that corresponds directly to the energy of the output beam 720 (see U.S. Pat. Nos. 4,611,270 and 6,212,214, which are hereby incorporated by reference). An optical configuration such as an optical attenuator, e.g., a plate or a coating, or other optics may be formed on or near the detector or beam splitter module 721 to control the intensity, spectral distribution and/or other parameters of the radiation impinging upon the detector (see U.S. patent applications Ser. Nos. 09/172,805, 09/741,465, 09/712,877 and 09/774,238, each of which is assigned to the same assignee as the present application and is hereby incorporated by reference).

One other component of the diagnostic module 718 is preferably a wavelength and/or bandwidth detection component such as a monitor etalon or grating spectrometer (see U.S. patent applications Ser. Nos. 09/416,344, 09/791,496, 09/686,483, 60/305,368, 09/883,128 and 09/791,431, each of which is assigned to the same assignee as the present application, and U.S. Pat. Nos. 4,905,243, 5,978,391, 5,450,207, 4,926,428, 5,748,346, 5,025,445, 6,161,831 and 5,978,394, all of the above wavelength and/or bandwidth detection and monitoring components being hereby incorporated by reference.

Other components of the diagnostic module may include a pulse shape detector or ASE detector, such as are described at U.S. Pat. Nos. 6,243,405 and 6,243,406, respectively, which are hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206 which is assigned to the same assignee and is hereby incorporated by reference.

Control Processor

The processor or control computer 716 receives and processes values of some of the pulse shape, energy, ASE, energy stability, energy overshoot for burst mode operation, wavelength, spectral purity and/or bandwidth, among other input or output parameters of the laser system and output beam. The processor 716 also controls the line narrowing module to tune the wavelength and/or bandwidth or spectral purity, and controls the power supply and pulser module 704 and 708 to control preferably the moving average pulse power or energy, such that the energy dose at points on the workpiece is stabilized around a desired value. In addition, the computer 716 controls the gas-handling module 706 which includes gas supply valves connected to various gas sources. Further functions of the processor 716 have been described above in relation to preferred wavelength chirp compensation algorithms.

Gas Mixture

The laser gas mixture is initially filled into the laser chamber 702 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,662, 6,243,406 and 4,977,573 and U.S. patent applications Ser. Nos. 09/513,025, 09/447,882, and 09/688,561, which are assigned to the same assignee and are hereby incorporated by reference into the present application. The concentration of the fluorine in the gas mixture may range from 0.003% to 1.00%, and is preferably around 0.1%. An additional gas additive, such as a rare gas, may be added for increased energy stability and/or as an attenuator as described in the U.S. patent application Ser. No. 09/513,025 incorporated by reference above. Specifically, for the F$_2$-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Gas Replenishment, General

Halogen and rare gas injections, total pressure adjustments and gas replacement procedures are performed using the gas handling module 706 preferably including a vacuum pump, a valve network and one or more gas compartments. The gas handling module 706 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 and 5,396,514 and U.S. patent application Ser. Nos. 09/447,882, 09/418,052, 09/734,459, 60/198,058 and 09/688,561, which are assigned to the same assignee as the present application, and U.S. Pat. Nos. 5,978,406, 6,014,398 and 6,028,880, all of which are hereby incorporated by reference. A xenon gas supply may be included either internal or external to the laser system according to the U.S. patent application Ser. No. 09/513,025 application, mentioned above.

Line-Narrowing

A general description of the line-narrowing features of the several embodiments of the present is provided here, followed by a listing of patent and patent applications being incorporated by reference as describing variations and features that may used within the scope of the present invention for providing an output beam with a high spectral purity or bandwidth (e.g., below 1 pm). Exemplary line-narrowing optics contained in the optics module 710 include a beam expander, an optional etalon or other interferometric device, and a diffraction grating, which produces a relatively high degree of dispersion, for a narrow band laser such as is used with a refractive or catadioptric optical lithography imaging system. As mentioned above, the front optics module 712 may include line-narrowing optics as well (see the U.S. patent application Ser. Nos. 09/718,809, 09/883,127, 09/718,803, and 09/738,849 applications, each being assigned to the same assignee and hereby incorporated by reference).

For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 710 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the U.S. patent application Ser. No. 09/771,366 and the U.S. Pat. No. 6,154,470, mentioned above. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the U.S. patent applications described herein, are each hereby incorporated by reference into the present application.

Optics module 712 preferably includes means for outcoupling the beam 720, such as a partially reflective resonator reflector. The beam 720 may be otherwise outcoupled such as by an intra-resonator beam splitter or partially reflecting surface of another optical element, and the optics module 712 would in this case include a highly reflective mirror. The optics control module 714 preferably controls the optics modules 710 and 712 such as by receiving and interpreting signals from the processor 716, and initiating realignment or reconfiguration procedures.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A wavelength chirp compensation method for an excimer or molecular fluorine laser system operating in burst mode, comprising:

pre-programming into a computer of the laser system resonator tuning optic adjustments for making the adjustments during pauses between bursts to compensate wavelength chirp at beginnings of succeeding bursts;

wherein the resonator tuning optic adjustments are determined according to the steps of:

operating the laser system at an operating duty cycle such that the laser system is in a condition which corresponds to a burst when the laser is operated in burst mode;

switching the laser system to a nominal duty cycle;

measuring wavelengths of laser pulses generated at the nominal duty cycle for a period of time without adjusting resonator optics to adjust the wavelength; and calculating the resonator tuning optic adjustments, based on the wavelengths measured over the period of time, wherein the calculated adjustments, provide for adjusting an output wavelength during the nominal duty cycle, so that the output wavelength during the nominal duty cycle is closer to a desired output wavelength when the laser in operated during a burst.

2. The method of claim 1, further comprising the steps of:

operating the laser system in burst mode after the pre-programming step;

making the adjustments during pauses between bursts to compensate wavelength chirps at beginnings of bursts; and returning the tuning resonator optic to standard operating position after a chirp period at the beginnings of the bursts.

3. A wavelength chirp compensation method for an excimer or molecular fluorine laser system operating in burst mode, comprising:

pre-programming into a computer of the laser system resonator tuning optic adjustments for making the adjustments during pauses between bursts to compensate wavelength chirp at beginnings of succeeding bursts;

operating the laser system in burst mode after the pre-programming step;

making the adjustments during pauses between bursts to compensate wavelength chirps at beginnings of bursts; and returning the tuning resonator optic to standard operating position after a chirp period at the beginnings of the bursts.

4. A wavelength chirp compensation method for an excimer or molecular fluorine laser system operating in burst mode, comprising:

pre-programming into a computer of the laser system resonator tuning optic adjustments for making the adjustments during pauses between bursts to compensate wavelength chirp at beginnings of succeeding bursts;

wherein the resonator tuning optic adjustments are determined according to the steps of:

operating the laser system at an operating duty cycle such that the laser system is in a condition which corresponds to a burst when the laser is operated in burst mode;

switching the laser system to a nominal duty cycle;

adjusting a resonator tuning optic position to maintain laser pulses at approximately a target wavelength during a period of time that the laser system is operated at the nominal duty cycle; and recording the resonator tuning optics positions according to the adjustments made during the adjusting step.

5. The method of claim 4, further comprising the steps of:

operating the laser system in burst mode after the pre-programming step;

making the adjustments during pauses between bursts to compensate wavelength chirps at beginnings of bursts; and returning the resonator tuning optic to standard operating position after a chirp period at the beginnings of the bursts.

6. The method of claim 1, wherein the resonator tuning optic adjustments are determined according to the steps of:

operating the laser system at an operating duty cycle such that the laser system is in a condition which corresponds to a burst when the laser is operated in burst mode;

switching the laser system to a nominal duty cycle;

measuring wavelengths of laser pulses generated at the nominal duty cycle for a period of time without adjusting resonator optics to adjust the wavelength;

calculating the resonator tuning optic adjustments, based on the wavelengths measured over the period of time, which if made would have compensated wavelength changes occurring during the period of time; and repeating these operating, switching, measuring and calculating steps at one or more additional operating duty cycles.

7. The method of claim 6, further comprising the steps of:

operating the laser system in burst mode at a selected operating duty cycle after the pre-programming step;

making the adjustments according to the selected operating duty cycle during pauses between bursts to compensate wavelength chirps at beginnings of bursts; and returning the tuning resonator optic to standard operating position after a chirp period at the beginnings of the bursts.

8. The method of claim 1, wherein the resonator tuning optic adjustments are determined according to the steps of:

operating the laser system at an operating duty cycle such that the laser system is in a condition which corresponds to a burst when the laser is operated in burst mode;

switching the laser system to a nominal duty cycle in a range between just sufficient to enable wavelength measurements to be made and below where laser operating conditions are significantly affected by generating laser pulses at the nominal duty cycle, such that the laser system changes substantially as it would during a burst pause for a laser operating in burst mode;

adjusting a resonator tuning optic position to maintain laser pulses at approximately a target wavelength during a period of time that the laser system is operated at the nominal duty cycle;

recording the resonator tuning optics positions according to the adjustments made during the adjusting step; and repeating these operating, switching, adjusting and recording steps at one or more additional operating duty cycles.

9. The method of claim 8, further comprising the steps of:

operating the laser system in burst mode at a selected operating duty cycle after the pre-programming step;

making the adjustments according to the selected operating duty cycle during pauses between bursts to compensate wavelength chirps at beginnings of bursts; and returning the tuning resonator optic to standard operating position after a chirp period at the beginnings of the bursts.

10. The method of claim 1, wherein the resonator tuning optic adjustments are determined according to the steps of:

operating the laser system at a first aging state and at an operating duty cycle such that the laser system is in a condition which corresponds to a burst when the laser is operated in burst mode;

switching the laser system to a nominal duty cycle in a range between just sufficient to enable wavelength measurements to be made and below where laser operating conditions are significantly affected by generating laser pulses at the nominal duty cycle, such that the laser system changes substantially as it would during a burst pause for a laser operating in burst mode;

measuring wavelengths of laser pulses generated at the nominal duty cycle for a period of time without adjusting resonator optics to adjust the wavelength;

calculating the resonator tuning optic adjustments, based on the wavelengths measured over the period of time, which if made would have compensated wavelength changes occurring during the period of time; and repeating these operating, switching, measuring and calculating steps at one or more additional aging states.

11. The method of claim 10, further comprising the steps of:

operating the laser system in burst mode at a particular aging state after the pre-programming step;

making the adjustments according to the particular aging state during pauses between burst to compensate wavelength chirps at beginnings of bursts; and returning the tuning resonator optic to standard operating position after a chirp period at the beginnings of the bursts.

12. The method of claim 1, wherein the resonator tuning optic adjustments are determined according to the steps of:

operating the laser system at a first aging state and at an operating duty cycle such that the laser system is in a condition such as during a burst when the laser is operated in burst mode;

switching the laser system to a nominal duty cycle in a range between just sufficient to enable wavelength measurements to be made and below where laser operating conditions are significantly affected by generating laser pulses at the nominal duty cycle, such that the laser system changes substantially as it would during a burst pause for a laser operating in burst mode;

adjusting a resonator tuning optic position to maintain laser pulses at approximately a target wavelength during a period of time that the laser system is operated at the nominal duty cycle;

recording the resonator tuning optics positions according to the adjustments made during the adjusting step; and repeating these operating, switching, adjusting and recording steps at one or more additional aging states.

13. The method of claim 12, further comprising the steps of:

operating the laser system in burst mode at a particular aging state after the pre-programming step;

making the adjustments according to the particular aging state during pauses between bursts to compensate wavelength chirps at beginnings of bursts; and returning the tuning resonator optic to standard operating position after a chirp period at the beginnings of the bursts.

* * * * *